G. S. SHEFFIELD,

Assignor to G. S. SHEFFIELD & Co.

Hand Car.

No. 9,571. Reissued Feb. 15, 1881.

WITNESSES

E. J. Nottingham

F. O. McCleary

INVENTOR

George S. Sheffield.

By Wells W. Duggett - ATTORNEY.

N. PETERS, PHOTO-LITHOGRAPHER, WASHINGTON, D. C.

UNITED STATES PATENT OFFICE.

GEORGE S. SHEFFIELD, OF THREE RIVERS, MICH., ASSIGNOR TO GEORGE S. SHEFFIELD & CO., OF SAME PLACE.

HAND-CAR.

SPECIFICATION forming part of Reissued Letters Patent No. 9,571, dated February 15, 1881.

Original No. 213,254, dated March 11, 1879. Application for reissue filed December 4, 1880.

*To all whom it may concern:*

Be it known that I, GEORGE S. SHEFFIELD, of Three Rivers, in the county of St. Joseph and State of Michigan, have invented a new and valuable Improvement in Railway Hand-Trucks; and I do hereby declare that the following is a full, clear, and exact description of the construction and operation of the same, reference being had to the annexed drawings, making a part of this specification, and to the letters and figures of reference marked thereon.

Figure 1:
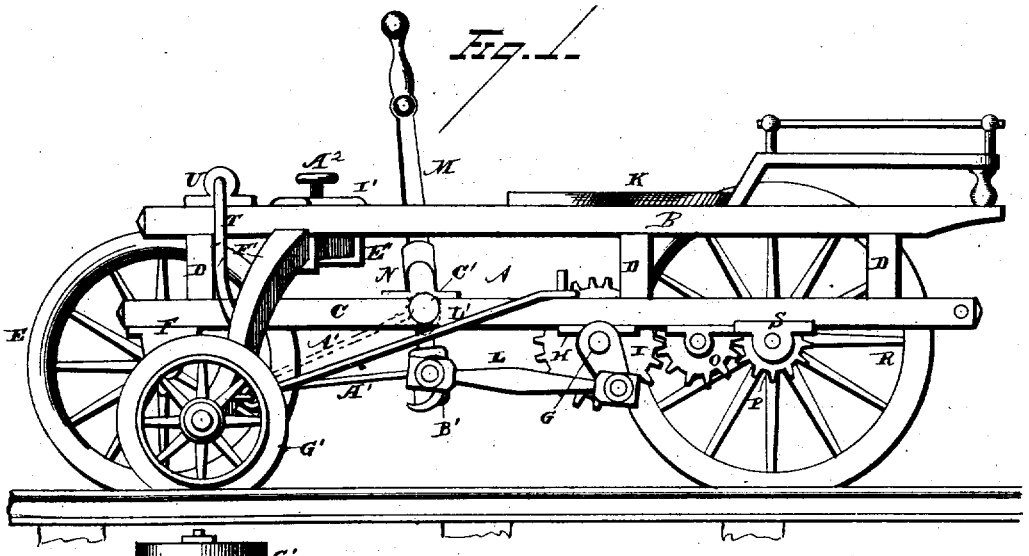
Figure 2:
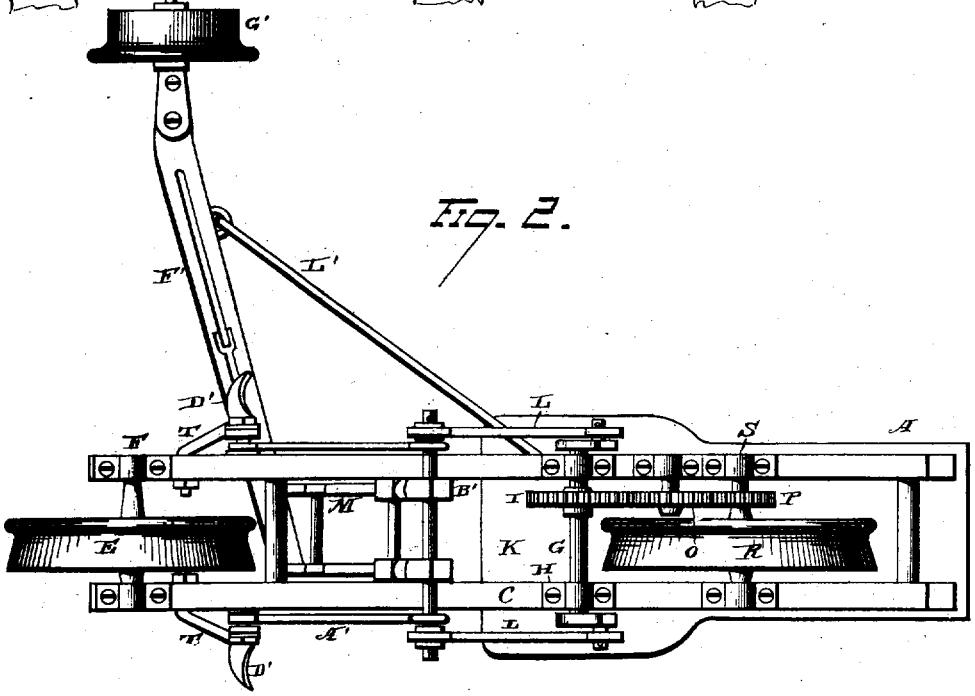

Figure 1 of the drawings is a representation of a side elevation of my railroad hand-truck, and Fig. 2 is a bottom plan view of the same.

My invention relates to a railway-velocipede (a portable hand-truck) adapted to operate upon a track of broad or narrow gage; and the novelty consists in the construction and combination of parts, hereinafter particularly set forth.

In carrying out my invention I employ two longitudinal bars, below connected together and to two similar bars above. In the lower bars I journal a forward riding-wheel and a rear driving-wheel. A crank-shaft carrying a cog-wheel is suitably journaled in the lower bars. A pitman from the crank connects with the arms of a pivoted hand-lever, and the cog-wheel, by a train of multiplying gear, connects with a pinion rigid upon the shaft of the drive-wheel.

Pivoted upon the forward end of the upper bars are pendent arms carrying hooked links, which are removably engaged with the arms upon the pivoted hand-lever, and a stud above holds the same firmly up when not in use. A stirrup or foot-rest is secured to the junction of each link and pendant, and may be used, in connection with the hand-lever, to multiply power, or simply as a foot-brace, as desired. The wheels are slightly beveled from the outer edges of their peripheries toward the flange, which serves to keep them on the rail. Sockets in the frame afford bearings for a lateral arm or axle, which carries a smaller flanged wheel, which traverses the opposite rail in order to confine the truck to the track. The lateral arm is adjustably secured in the sockets, so that it can be shifted to adapt the car to a broad or narrow gage road, the said bar being held in the desired position by means of a set-screw extending through a cross-beam secured to the upper longitudinal bars.

The letter A represents the truck of my improved railway-velocipede, consisting of two upper longitudinal parallel bars, B B, and two lower longitudinal parallel bars, C C, the upper and lower bars being connected together by means of a series of vertical standards, D D D.

The letter E represents a forward riding-wheel, journaled in bearings F F at the forward ends of the lower longitudinal bars, C C.

The letter G represents a crank-shaft, journaled in bearings H H on the lower bars, C C, and carrying a cog-wheel, I.

The letters L L represent pitmen, connected to the crank-pins of the crank-shaft G, and with a hand-lever, M, pivoted in bearings N on the lower bars, C C. The cog-wheel I intermeshes with a smaller cog-wheel, O, which intermeshes, in turn, with a pinion, P, rigidly mounted on the shaft of the driving-wheel R, which is journaled in bearings S on the lower longitudinal bars, C C. The tread of both the riding-wheel and the driving-wheel is made slightly concave in cross-section, in order to hug the rail and better confine the truck to the track.

The letters T T represent two pendent arms, pivoted in bearings U U on the upper bars, and carrying at their lower ends hooked links A′ A′, which are adapted to be detachably secured to the arm B′ of the hand-lever M.

The letters C′ C′ represent studs, attached to the bars C C, to which the hooked links may be attached when not in use.

D′ represents a stirrup or foot-rest, secured to the junction of each link and pendant, which may be used, in connection with the hand-lever, to multiply power, or as a foot brace or rest, as may be desired.

The letter E′ represents two sockets, secured to the lower sides of the upper bars, B B, in which is adjustably mounted a lateral arm, F′, carrying at its outer extremity a flanged wheel, G′, which is adapted to traverse the opposite rail to that upon which the riding and driving wheels travel.

The letter $A^2$ represents a set-screw, mounted in a cross-beam, I′, secured to the upper bars, B B, the lower end of said set-screw being adapted to be brought to bear against the lateral arm, so as to confine it in place when shifted in or out to adapt the car to broad or narrow gage roads. To the upper longitudinal bars is secured a seat, K′, for the operator, in such position that he may conveniently grasp and operate the hand-lever with his hands, his feet resting upon the stirrups secured to the pendants, which serve, as before mentioned, as foot-braces simply, or to multiply the power when the links are secured to the hand-lever.

The letter L′ represents a brace-rod, secured to the lateral arm of the car, and adapted to be detachably secured to a pin, M′, on one of the lower bars, C C, for the purpose of steadying said lateral arm.

I prefer to make the wheel, as shown in Fig. 3, with wooden spokes V, metallic periphery W, and metallic flange W′, the parts being fastened together, as shown. Such a wheel is light, yet strong and durable, and adds materially to the portability of the vehicle.

The entire frame of the velocipede is rigid, and there is no elastic medium between the seat and its supporting-bars. This does away with the danger of jumping the track, which a spring in such a position might cause.

I claim—

1. In a railway hand-truck or velocipede, the combination of a rigid frame and seat with crank mechanism for propelling said hand-truck, a pair of wheels arranged and adapted to run upon the same rail, and a supplementary frame extending laterally from said rigid frame and bearing a wheel in position to run on the other rail of the track, substantially as set forth.

2. In a railway hand-truck or velocipede, the combination of a rigid frame with treadle mechanism for propelling said hand-truck, two or more wheels arranged and adapted to run upon the same rail, and a supplemental frame attached to said rigid frame and carrying a wheel which is arranged to run on the other rail of the track, substantially as set forth.

3. A hand-truck or velocipede adapted to run upon a single line of rails, and provided with a lateral wheel to run upon the other line of rails, the said lateral wheel made adjustable to or from the main frame to suit railways of different gages, substantially as described.

4. A hand-truck or velocipede having two wheels arranged to run upon the same rail, an additional wheel arranged to run upon the other rail of the track, and a rigid frame and seat-support, substantially as set forth.

GEORGE S. SHEFFIELD.

Witnesses:

WARREN J. WILLITS,
JOHN FULCHER.